(12) United States Patent
Lai et al.

(10) Patent No.: US 8,986,047 B2
(45) Date of Patent: Mar. 24, 2015

(54) EXPANSION MODULE AND A FRAME THEREOF

(71) Applicant: Giga-Byte Technology Co., Ltd., New Taipei (TW)

(72) Inventors: Chih Ming Lai, New Taipei (TW); Yung-Shun Kao, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 199 days.

(21) Appl. No.: 13/662,554

(22) Filed: Oct. 29, 2012

(65) Prior Publication Data

US 2013/0288532 A1    Oct. 31, 2013

(30) Foreign Application Priority Data

Apr. 30, 2012    (TW) .............................. 101115385 A

(51) Int. Cl.
  *H01R 24/68*    (2011.01)
  *G06F 1/18*    (2006.01)

(52) U.S. Cl.
  CPC ..................................... *G06F 1/185* (2013.01)
  USPC .......................................... 439/629; 439/328

(58) Field of Classification Search
  CPC ..................................................... H05K 3/301
  USPC ........... 439/327, 328, 629; 361/801, 802, 807
  See application file for complete search history.

(56) References Cited

U.S. PATENT DOCUMENTS

| 3,216,580 | A | * | 11/1965 | Fricker, Jr. | .................. | 211/41.17 |
| 3,801,953 | A | * | 4/1974 | Lynch | ............................ | 439/377 |
| 3,829,741 | A | * | 8/1974 | Athey | ............................ | 361/756 |
| 4,349,237 | A | * | 9/1982 | Cobaugh et al. | .............. | 439/377 |
| 5,169,333 | A | * | 12/1992 | Yang Lee | ....................... | 439/326 |
| 5,650,917 | A | * | 7/1997 | Hsu | ................................. | 361/759 |
| 6,545,877 | B1 | | 4/2003 | Agha et al. | | |
| 6,629,855 | B1 | * | 10/2003 | North et al. | .................... | 439/325 |
| 7,278,872 | B2 | * | 10/2007 | Brown et al. | .................. | 439/351 |
| 7,641,495 | B1 | * | 1/2010 | Sun | ................................ | 439/327 |
| 7,848,116 | B2 | * | 12/2010 | Duppong et al. | ............. | 361/801 |
| 8,315,067 | B2 | * | 11/2012 | Chen et al. | ..................... | 361/802 |
| 2001/0012716 | A1 | * | 8/2001 | Corisis et al. | .................. | 439/357 |
| 2013/0288532 | A1 | * | 10/2013 | Lai et al. | ......................... | 439/629 |

FOREIGN PATENT DOCUMENTS

TW    M351382 A1    2/2009
TW    201146145 A1    12/2011

* cited by examiner

*Primary Examiner* — James Harvey
(74) *Attorney, Agent, or Firm* — Chun-Ming Shih

(57) ABSTRACT

An expansion module, for electrically connecting an interface card to a circuit board, includes an electrical connector and a frame. One side surface of the electrical connector is disposed on the circuit board and an electrical slot is disposed on the other side surface of the electrical connector for one end of the interface card to be inserted therein. The frame includes a main body, a fixing portion, and a securing portion. The fixing portion and the securing portion are integrally extended from the main body. The fixing portion is detachably installed to the circuit board, and the securing portion is for the other end of the interface card to be detachably fixed thereon, so as to arrange the interface card upright on the circuit board and reduce area on the circuit board occupied by the interface card.

6 Claims, 12 Drawing Sheets

EXPANSION MODULE AND A FRAME THEREOF

CROSS-REFERENCES TO RELATED APPLICATIONS

This non-provisional application claims priority under 35 U.S.C. §119(a) on Patent Application No. 101115385 filed in Taiwan, R.O.C. on Apr. 30, 2012, the entire contents of which are hereby incorporated by reference.

BACKGROUND

1. Field of the Invention

This disclosure is related to an expansion module for interface card, and more particularly related to an expansion module and a frame thereof for an interface card.

2. Related Art

With the evolution of the computer technology, interface card, such as the network card and the audio card, in the conventional computer are made in accordance with Personal Computer Interface (PCI) standard, to electrically connect to the computer circuit board via electrical slots. Besides PCI standard, other standards are also widely used, for example, PCI-X, PCI-E (PCI express), SATA (Serial Advanced Technology Attachment), SCSI (Small Computer System Interface), MINI PCI-E (MINI PCI EXPRESS) for laptop, and so on. Accordingly, these electrical slots for the interface cards are now the essential components of the computer mother board.

Most of the conventional interface cards connect to the electrical slots of the computer mother board in a horizontal manner. A horizontal interface card occupies large area on the mother board and causes the reduction of the reserved area for the other electronic components on the mother board. Or, some slots are covered by such a horizontal interface card and can not be used to install the other electronic components on the mother board.

In order to increase the useable space on the mother board, in some computers, the interface card is installed in a vertical manner. Meanwhile, to prevent vibration or loosing of the interface card, the free end of the interface card is locked on a frame by implementing a screw to stable the interface card when the interface card is inserted in the electrical slot. However, in the conventional frame of the interface card, the stud for the screw is fixed to the frame through punch method, so as to fix the stud within the assembling hole by tight fit. If the punching of the stub is incomplete or displaced, the stub will not be firmly secured on the frame, so as to seriously affect the yield rate of the product. In addition, suffering from impact, stud could be easily detached from the frame and fail to fix the interface card on the mother board. Moreover, the production cost of the conventional frame is high because it requires using different components and executing additional punching procedures.

SUMMARY OF THE INVENTION

In view of the forgoing problems, this disclosure provides an expansion module and a frame thereof, which is configured to fix the interface card on a circuit board in a vertical manner. The expansion module is used to overcome the problem that the reserved area for other electronic components is decreased, or the slots for other electronic components is covered and cannot be used properly since the interface card is disposed in a horizontal manner. Furthermore, this disclosure also solves that the stub for the screw on the frame would be easily loosed or detached by external impact force.

In one or more embodiments of this disclosure, an expansion module is used to electrically connect an interface card to a circuit board. The expansion module includes an electrical connector and a frame. The electrically includes two opposite side surface and an electrical slot. One side surface of the electrical connector is disposed to the circuit board, and the electrical slot is disposed on the other side of the electrical connector for the inserting interface card. The frame includes a main body, at least one fixing portion, and a securing portion. The main body, the fixing portion, and the securing portion are formed integrally. The fixing portion and the securing portion connect to two ends of the main body respectively. The fixing portion is detachably disposed to the circuit board. And the securing portion fixes the other end of the interface detachably.

In one or more embodiment of this disclosure, a frame is used to fix an interface card on a circuit board in a vertical manner. The circuit board includes an electrical connector for inserting the interface card. The frame includes a main body, two fixing portions, and at least one securing portion. The main body is disposed on the circuit board and extends along a normal line direction of the circuit board. Two fixing portions are disposed to the main body integrally, and the main body is disposed to the circuit board through the two fixing portions. The securing portion is disposed to the main body integrally, and is located on the edge away from the two fixing portions and corresponding to the electrical connector. When inserting one end of the interface card into the electrical connector, the securing portion fixes the other end of the interface card.

Through the expansion module and the frame in this disclosure, the electrical slot of the electrical connector is disposed on the side surface away from the circuit board, and the frame extends along the normal line direction of the circuit board. When inserting one end of the interface card into the electrical slot and the securing portion fixes the other end of the interface card, the interface card stands upright on the circuit board and the area occupied by the interface card is decreased. Therefore, the reserved area for the other electronic components is increased on the circuit board. In addition, the securing portion of the frame is integrally formed on the main body to prevent the securing portion be loosed or detached from the main body. When the interface card is fixed to the securing portion through screws, the interface card is more securely fixed to the frame to resist external impact force. Therefore, the stability of the interface card is enhanced so as to decrease the manufacture cost of the frame and increase the manufacture efficiency.

BRIEF DESCRIPTION OF THE DRAWINGS

The present invention will become more fully understood from the detailed description given herein below for illustration only, and thus not limitative of the present invention, wherein.

DETAILED DESCRIPTION OF THE INVENTION

The expansion module 10 in this disclosure is used to electrically connect an interface card 50 to a circuit board 30. In the same concept, the expansion module 10 in this disclosure includes several different embodiments in accordance with the disposition of the components and the connection relationship. The detail description is listed below.

Figure 1:
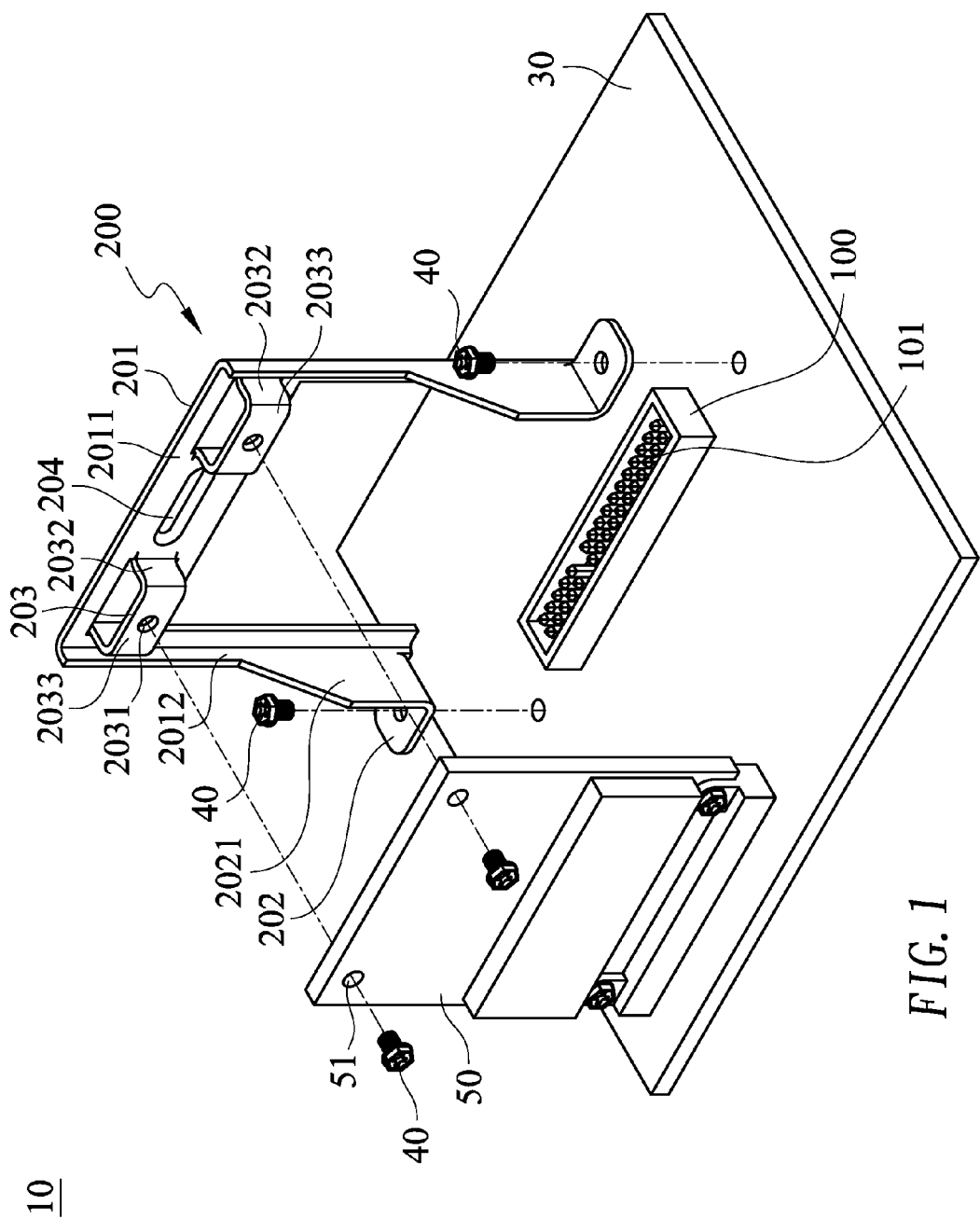
FIG. 1 is an explosive view according to a first embodiment of the present invention.
Figure 2:
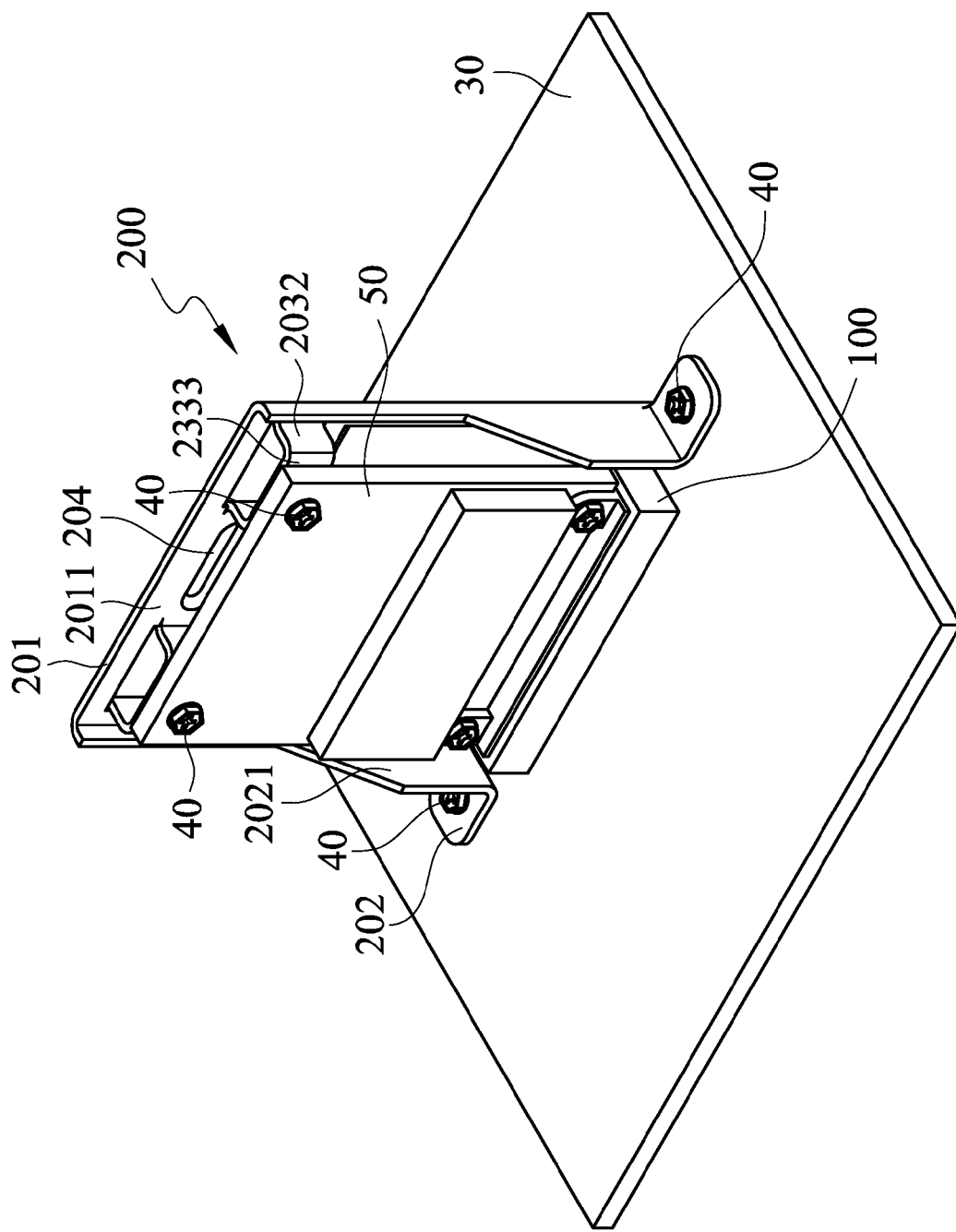
FIG. 2 is a schematic view of the first embodiment.

Referring to FIG. 1 and FIG. 2, the expansion module 10 in the first embodiment includes an electrical connector 100 and a frame 200. The electrical connector 100 includes two opposite side surface and an electrical slot 101. The electrical slot 101 is disposed on one side surface of the electrical connector 100, for inserting the interface card. A plurality of pins (not shown) is disposed on the other side surface of the electrical connector 100 for disposing this side surface to the circuit board 30 via dual inline package (DIP) method or surface mounting technology (SMT) method. The frame 200 of the expansion 10 includes a main body 201, two fixing portions 202, and two securing portions 203. The main body 201, the fixing portions 202, and the securing portions 203 are formed integrally. The two fixing portions 202 and the two securing portions 203 respectively connect to two opposite ends of the main body 201. It should be noted that the material of the frame 200 in this disclosure includes iron, aluminum alloy, carbon tin alloy, and so on, but it is not limited herein. Any materials which are able to support and steady the interface card 50 can be chosen by a person with ordinary skill in the art to be the material in this disclosure.

The frame 200 is disposed on the circuit board 30 and extends along the normal line direction of the circuit board 30. In other word, the main body 201 is disposed on the circuit board 30 in a vertical manner. The main body 201 includes a connecting portion 2011 and two supporting portions 2012. The two supporting portions 2012 are extends from the two opposite ends of the connecting portion 2011 and one end in each supporting portion 2012 connects to one end of the connecting portion 2011, and the other ends of the two supporting portions 2012 extend toward the same side of the connecting portion 2011. The other ends of the two supporting portions 2012 respectively connect to the two fixing portions 202. The two supporting portions 201 are bent and extend toward the same side of the connecting portion 2011. Therefore, the main body 201 and the two fixing portions 202 are integrally formed to be a frame structure with the shape of a hoof. Accordingly, the main body 201 is detachably disposed in one side of the circuit board 30 through the two fixing portions 202, and the main body 201 is located to a position close to the electrical connector 100. Therefore, the main body 10 can be disposed on the circuit board 30 through the two fixing portions 202 or detached from the circuit board 30.

In addition, the two securing portions 203 of the frame 200 extend from the connecting portion 2011 of the main body 201. Each of the securing portions 203 includes two straight portions 2032 and a joining portion 203. A positioning hole 2031 is disposed on the joining portion 2033 of the securing portion 203. The two straight portions 2032 of the securing portion 203 connect to the connecting portion 2011 of the main body 201. The joining portion 2033 of the securing portion 203 connects to the two straight portions 2032 and spaced from the connecting portion 2011 of the main body 201 with an interval. Therefore, the securing portion 203 is protruded on the surface of the connecting portion 2011 and located corresponding to the electrical slot 101 of the electrical connector 100. The two securing portions 203 are integrally formed in one side of the main body 201, which is away from the two fixing portions 202, and is suspended above the electrical connector 100 of the circuit board 30.

Please referring to FIG. 1 and FIG. 2, when the interface card 50 is inserted in the expansion module 10, one end of the interface card 50 with golden fingers is inserted into the electrical slot 101 of the electrical connector 100. At this time, the other end of the interface card 50 is located corresponding to one side surface of the frame 200 where the two securing portions 203 is formed thereon. The interface card 50 includes a plurality of through holes 51 for fasten parts 40 passing through. When the interface card 50 presses against the securing portions 203 of the frame 200, the fasten part 40 passes the thought hole 51 of the interface card 50 and fixed within the corresponding positioning hole 2031 on the connecting portion 2033 of the two securing portions 203, so as to fix the interface card 50 to the two securing portions 203 of the frame 200. Therefore, the interface card 50 can be disposed on the circuit board 30 in a vertical manner through the electrical connector 100. Accordingly, the problem that the reserved area for other electronic components is occupied by the horizontal interface card 50 can be avoided. Moreover, because the securing portion 203 of the frame 200 is integrally formed and extended from the main body 201, the loosing or shifting of the securing portion 203 caused by the external impact force can be avoided, so as to enhance the yield rate of the product.

It should be noted that the fasten part 40 described in the present embodiment is, but not limited, a screw, a proximal screw, or any other locking components. A person having ordinary skill in the art can choose a proper type of fasten part in accordance with the practical requirement. In addition, in the present embodiment the interface card 50 is fixed to the two securing portions 203 of the frame 200 through the fasten parts 40. It is not necessary to fix the interface card 50 to both securing portions 230 at a time. A single securing portion 203 is enough to securely fix the interface card 50, and two or more securing portion 203 can enhance in fixing force for fixing the interface card 50 to the frame 200.

Moreover, the frame 200 can be equipped with only one securing portion 203 integrally formed on the connecting portion 2011 of the main body 201. And the joining portion 2033 of the securing portion 203 extends from one of the supporting portion 2012 to another supporting portion 2012. A plurality of positioning holes 2031 can be formed on one joining portion 2033 of the securing portion 203 for plural fasten part 40 passing through, so as to fix the interface card 50 to the single securing portion 203 firmly. It should be noted that the description above is only illustrating the different of the disposing method and the quantity of the securing portion 203 and the positioning holes 2031 on the frame 200 and it is not limited in the present invention.

Figure 3:
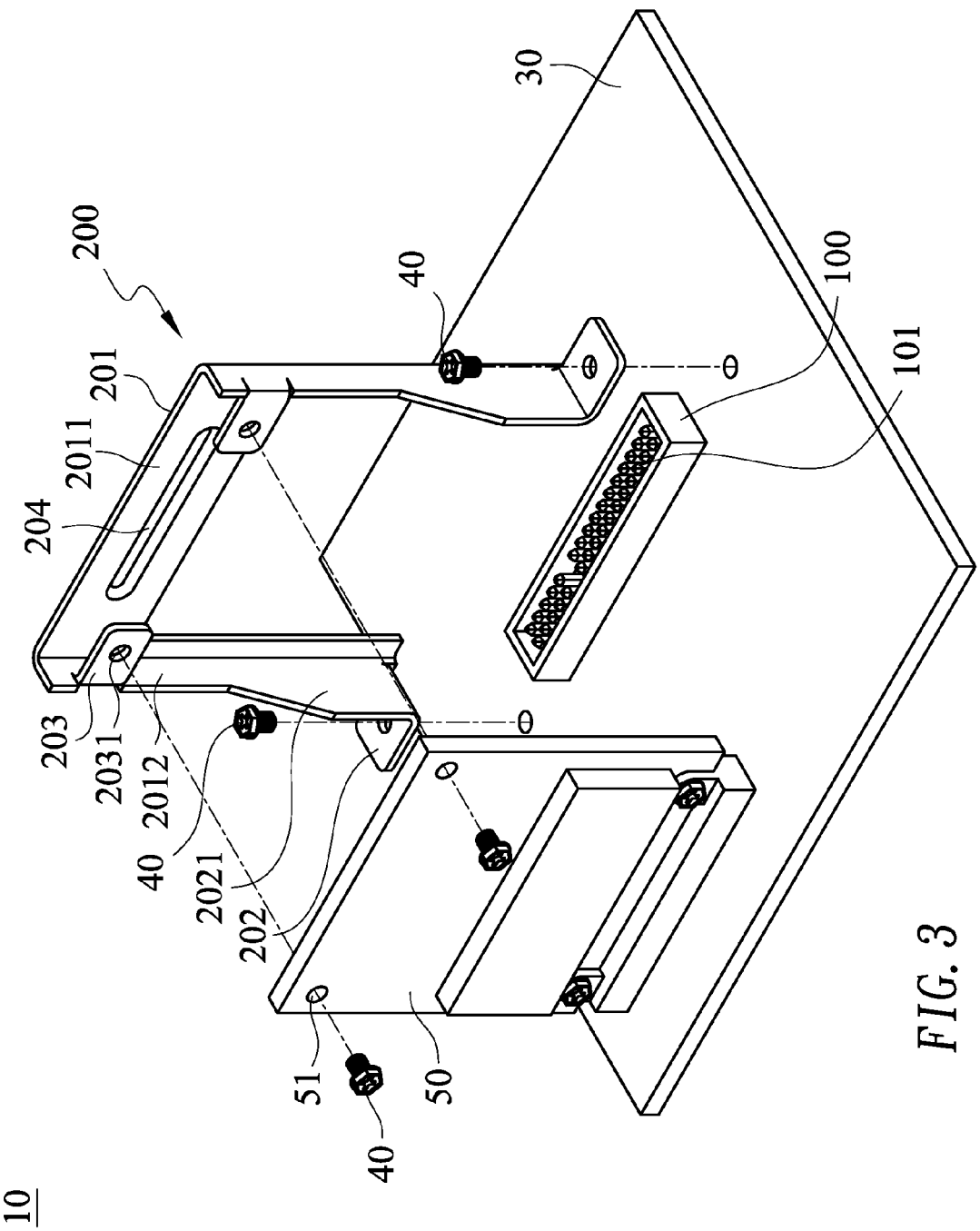
FIG. 3 is an explosive view according to a second embodiment.

Referring to FIG. 3, it is an explosive view illustrating a second embodiment. In the second embodiment, the structure of the expansion module 20 is similar to the expansion module in the first embodiment. The different is that the two securing portions 203 of the frame 200 in the second embodiment are sheet structures with long and narrow shape and respectively extended from a sheet structure the two supporting portions 2012 of the main body 201. The two securing portions 203 are respectively bent and extended from one edge of the two supporting portions 2012. Therefore, one end of the securing portion 203 connects to the one edge of the supporting portion 2012 and the other end of the securing portion 203 extends toward another supporting portion 2012. The securing portion 230 is spaced from the connecting portion 2011 of the main body 201. The positioning holes 2031 on the two securing portion 203 are corresponding to the connecting portion 2011 of the main body 201.

As the description above, the method for the user to insert the interface card 50 in the expansion module 10 is the same as the first embodiment. Please refer to FIG. 4, when one end of the interface card 50 electrically inserts in the electrical slot 101 of the electrical connector 100, the securing portions 230 fix the interface card by the fasten parts 40 passing through the through hole 51 of the interface card 50 and the interface card is fixed within the positioning hole 2031 of the two securing portion 203.

Figure 5:
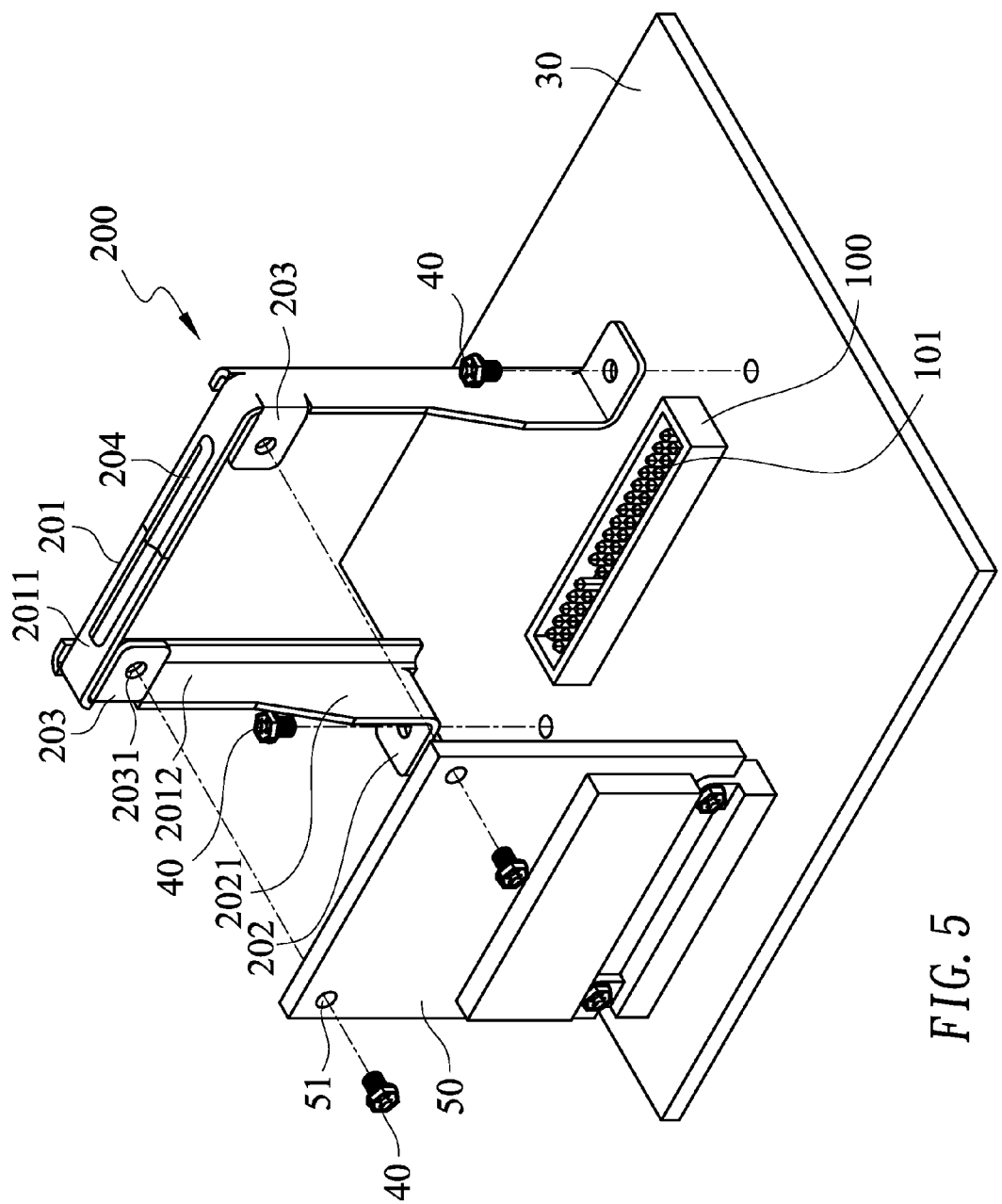
FIG. 5 is an explosive view according to a third embodiment.

Referring to FIG. 5, it is an explosive view illustrating a third embodiment. The structure of the expansion module 10 in the third embodiment is similar to the expansion module 10 in the second embodiment. The different is that the two supporting portions 2012 of the main body 201 in the third embodiment is formed by bending the two opposite ends of the connecting portion 2011. Therefore, one end of the two supporting portions 2012 connects to the connecting portion 2011. The two supporting portions 2012 is bent and extends from two opposite ends of the connecting portion 2011, and the two supporting portions 2012 extends toward the same side of the connecting portion 2011.

The two securing portions 203 of the frame 200 in the third embodiment are similar to the securing portions 203 in the second embodiment and are disposed on the two supporting portions 2012 of the main body 201. One end of the securing portion 203 connects to one edge of the supporting portion 2012 and the other end of the securing portion 203 extends toward another supporting portion 2012. It should be noted that the main body 201 of the frame 200 in the third embodiment is formed by bending the two opposite ends into a single long and narrow plate or sheet. Therefore, the two supporting portions 2012 connect to the connecting portion 2011 and extend toward the same side. The surface of the connecting portion 2011 and the surface of the two supporting portions 2012 form a continuity surface. Therefore, when the frame 200 in the third embodiment of the present invention is made by the manufacturer, the material is cut to be a long and narrow sheet or plate. The two opposite ends of the long and narrow sheet or plate are bent toward the same direction to form the structure described above. It is not necessary to implement the punch method to remove the material between the connecting portion 2011 and the two supporting portions 2012 by a mold in the conventional frame. Therefore, the consumption of the material is reduced and the manufacture cost is decreased.

Figure 4:
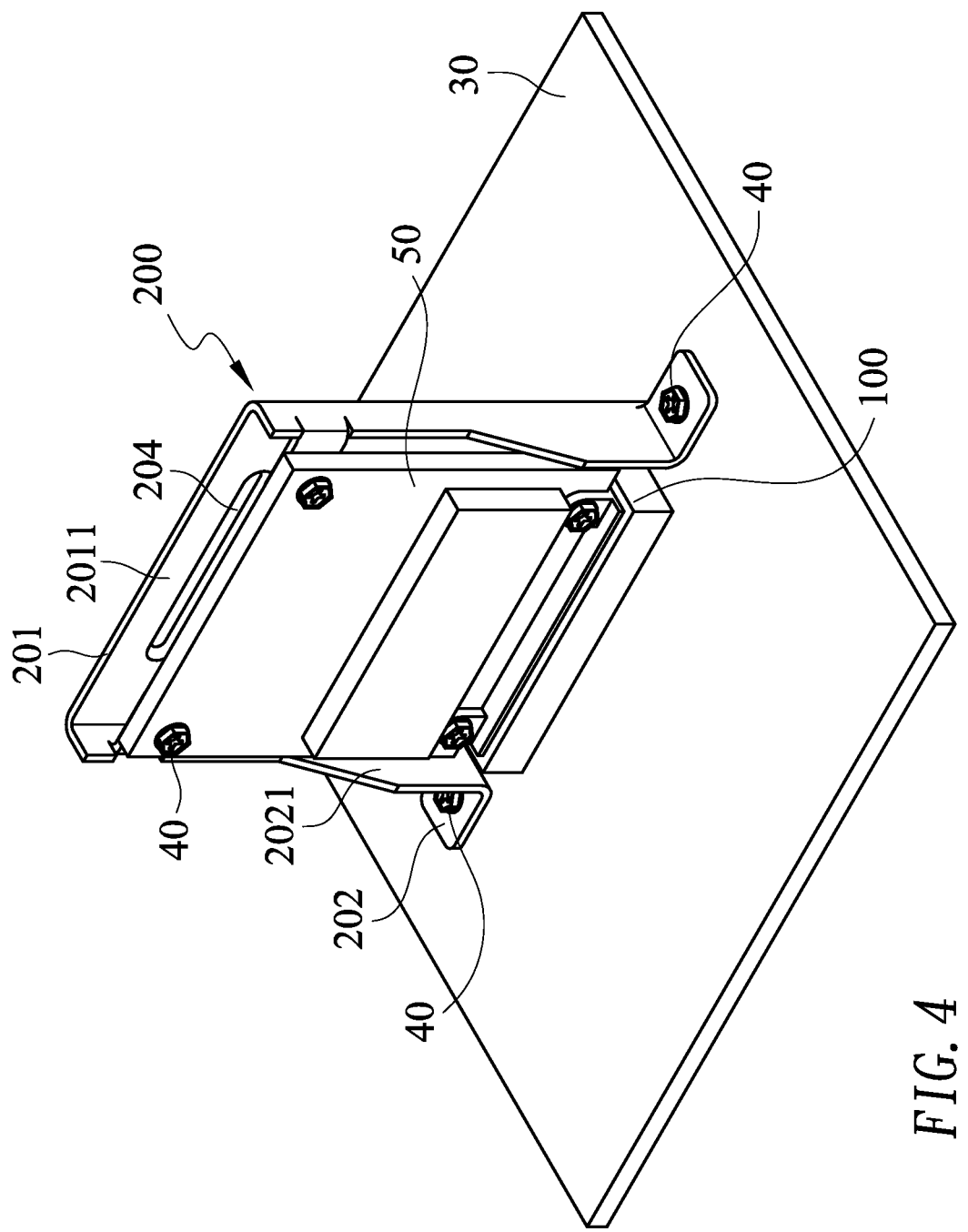
FIG. 4 is a schematic view of the second embodiment.
Figure 6:
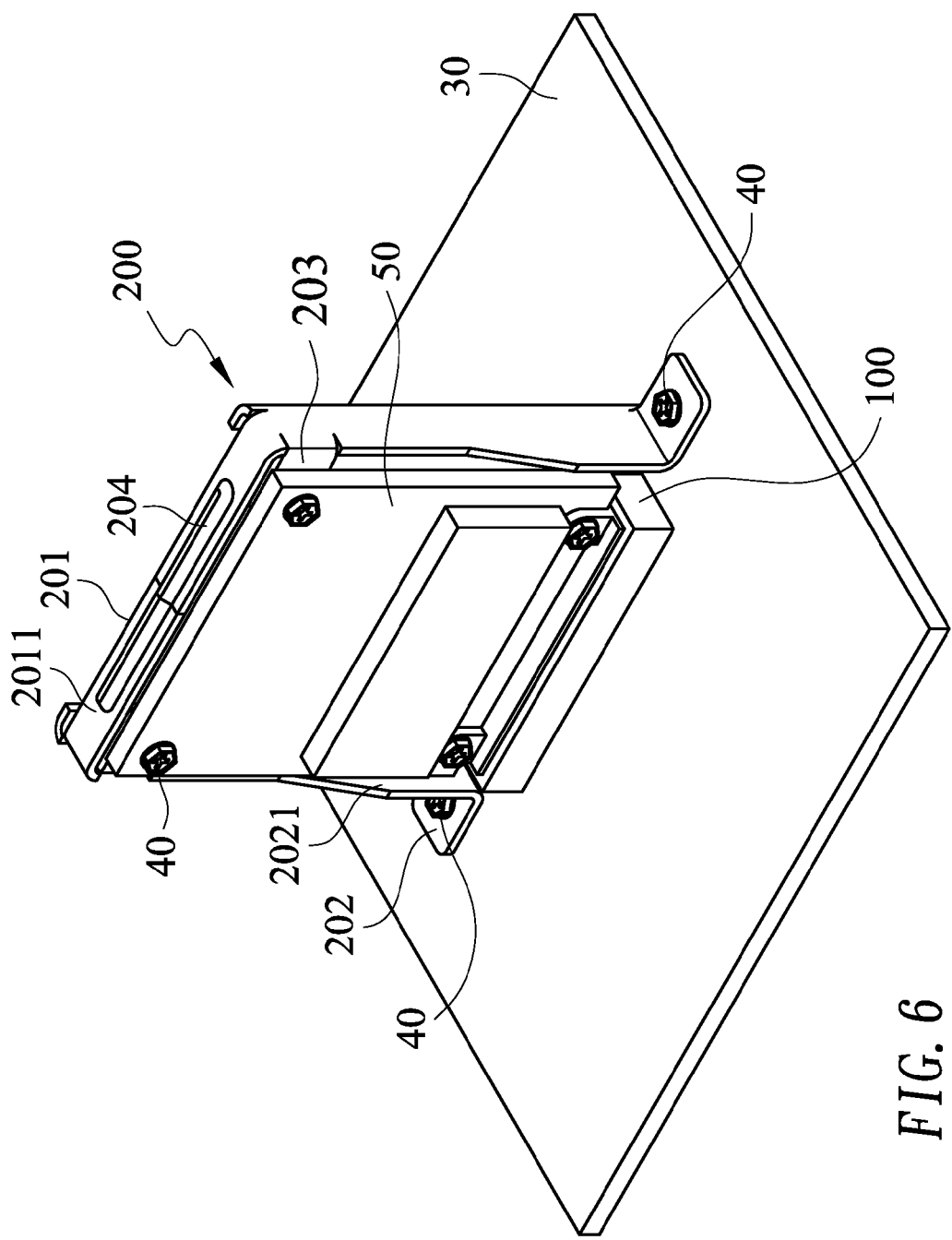
FIG. 6 is a schematic view of the expansion module of the third embodiment.

Referring to FIG. 6, in addition, the operation implemented by the user to insert and fix the interface card 50 in the expansion module 10 of the third embodiment is the same as the operation described in the first embodiment of FIG. 2 and the second embodiment of FIG. 4. Therefore, the detail description thereof is omitted herein.

It should be noted that the frame 200 of the expansion module 10 in the previous embodiment is a structure with two symmetrical sides. However, it could be understood that, in other embodiments of the present invention, the supporting portion 2012 formed on the main body 201 of the frame 200 and the fixing portion 202 or the securing portion 203, which connects to the main body, can be made by one side structure.

Figure 7:
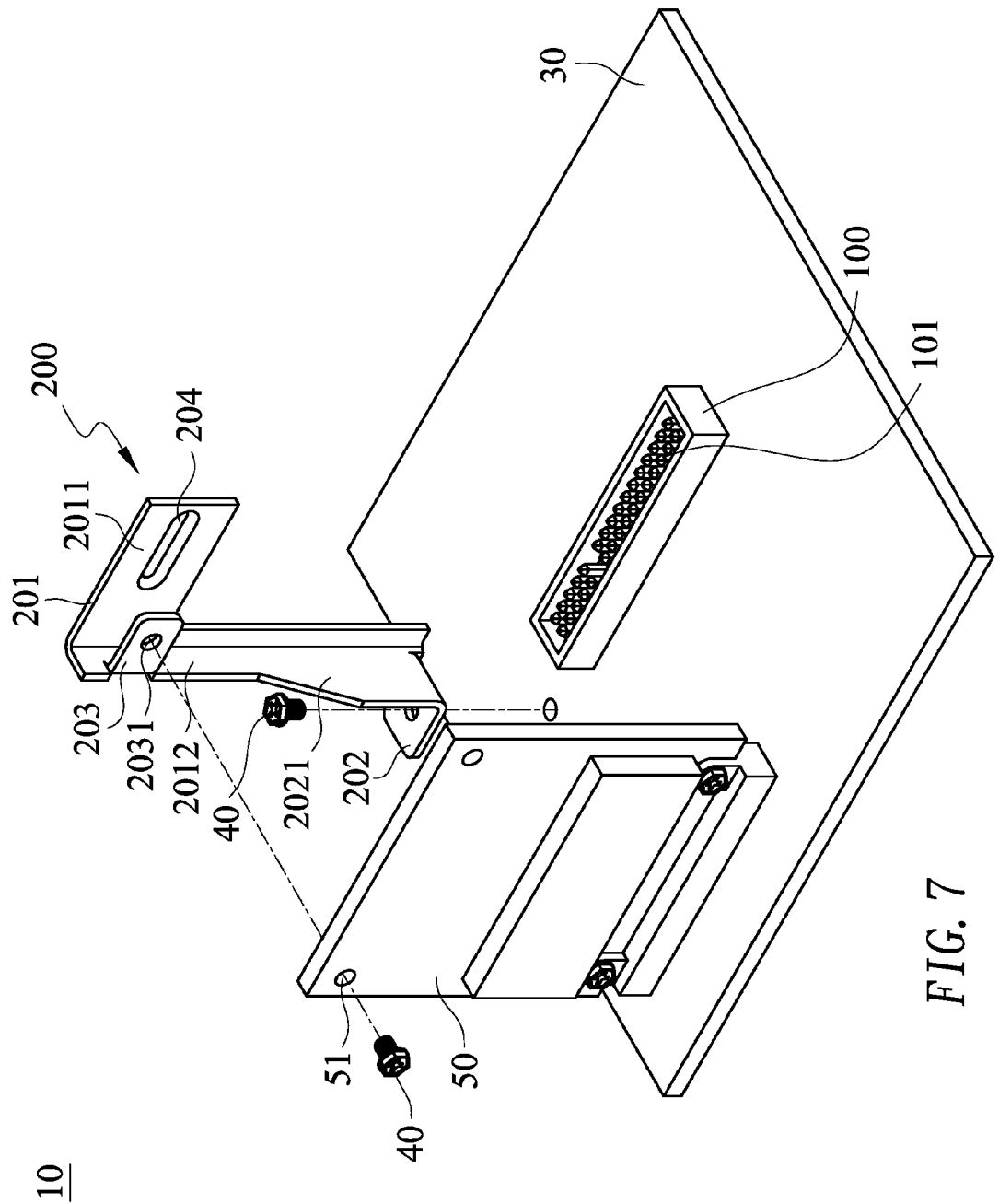
FIG. 7 is an explosive view according to a fourth embodiment.
Figure 8:
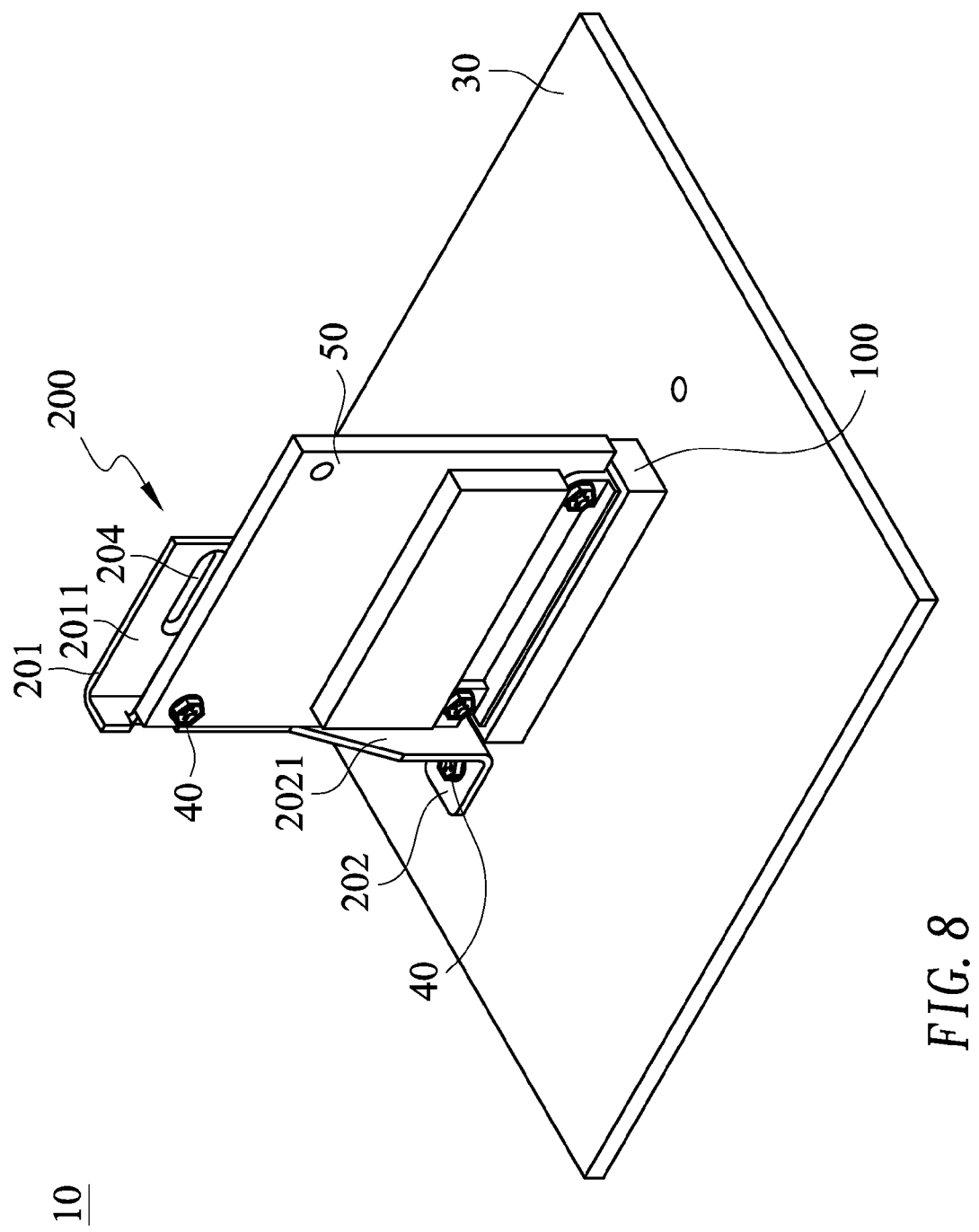
FIG. 8 is a schematic view of the expansion module of the fourth embodiment.

Referring to FIG. 7 and FIG. 8, the expansion module 10 disclosed in the fourth embodiment is similar to the expansion module 10 in the second embodiment. The different is that the frame 200 in the present embodiment only includes a main body 201, a fixing portion 202, and a securing portion 203. In addition, the main body 201 includes a connecting portion 2011 and a supporting portion 2012 connected together. The main body 201 can be simply composed by a supporting portion 2012 connecting the fixing portion 202 and the securing portion 203. The fixing portion 202 and the securing portion 203 respectively connect to the two ends of the supporting portion 2012 of the main body 201. Through such a single side structure of the frame 200, the consumption of the material is reduced and the manufacture cost is decreased. In addition, the space of the circuit board can be saved and the operation procedure for the user to lock the interface card 50 in the frame 200 is simplified.

Moreover, in order to enhance the stability of the interface card 50 fixed to the frame 200 of the expansion module 10, the main body 201 of the frame 200 and the securing portion 203 is configured as those shown in the first embodiment. A plurality of fasten part 40 is used to fix the interface card 50 to the frame 200.

Figure 9:
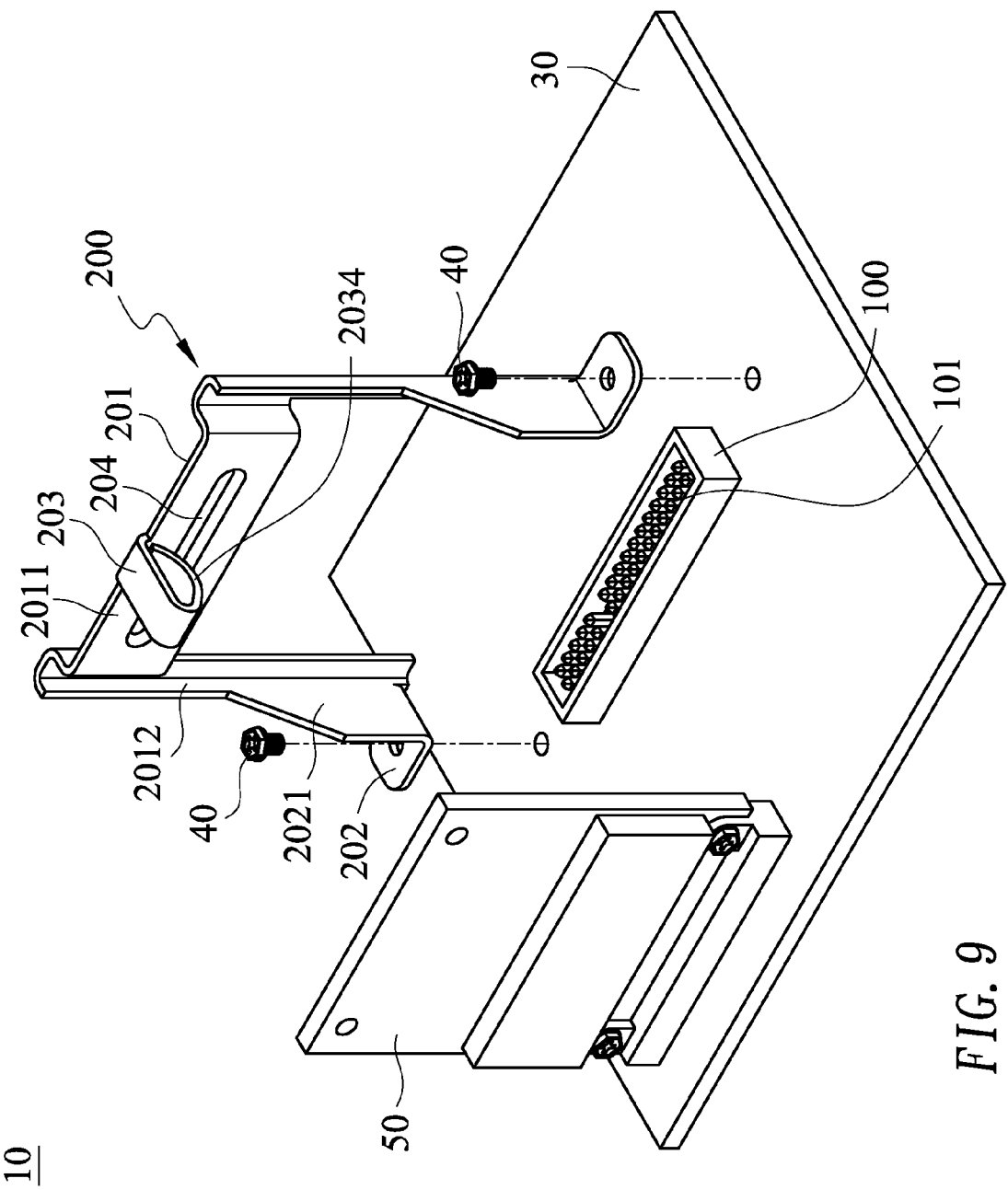
FIG. 9 is an explosive view according to a fifth embodiment.

Referring to FIG. 9, an explosive view illustrates the fifth embodiment. The expansion module 10 in the present embodiment is similar to the expansion module in the second embodiment. The different is that in the present embodiment the frame 200 of the expansion module 10 includes a main body 201, two fixing portion 202, and a securing portion 203, and the main body 201, the two fixing portion and the securing portion 203 are integrally formed. The main body 201 includes a connecting portion 2011 and two supporting portion 2012. One end of each of the two supporting portions 2012 respectively connects to opposite ends of the connecting portion 2011, and the other end of each of the two supporting portions 2012 extends on the same side wall which is close to the connecting portion 2011 and respectively connects to the two fixing portions 202. The two fixing portions 202 are formed by bending the two supporting portions 2012 toward two opposite directions. In addition, the securing portion 203 of the frame 200 is an integrally formed structure which is located among the two supporting portions 2012 and formed by bending and extending edge of the connecting portion 2011. One end of the securing portion 203 connects to the connecting portion 2011 of the main body 201 and the other end thereof is a clip 2034 with a reverse hook shape.

Figure 10:
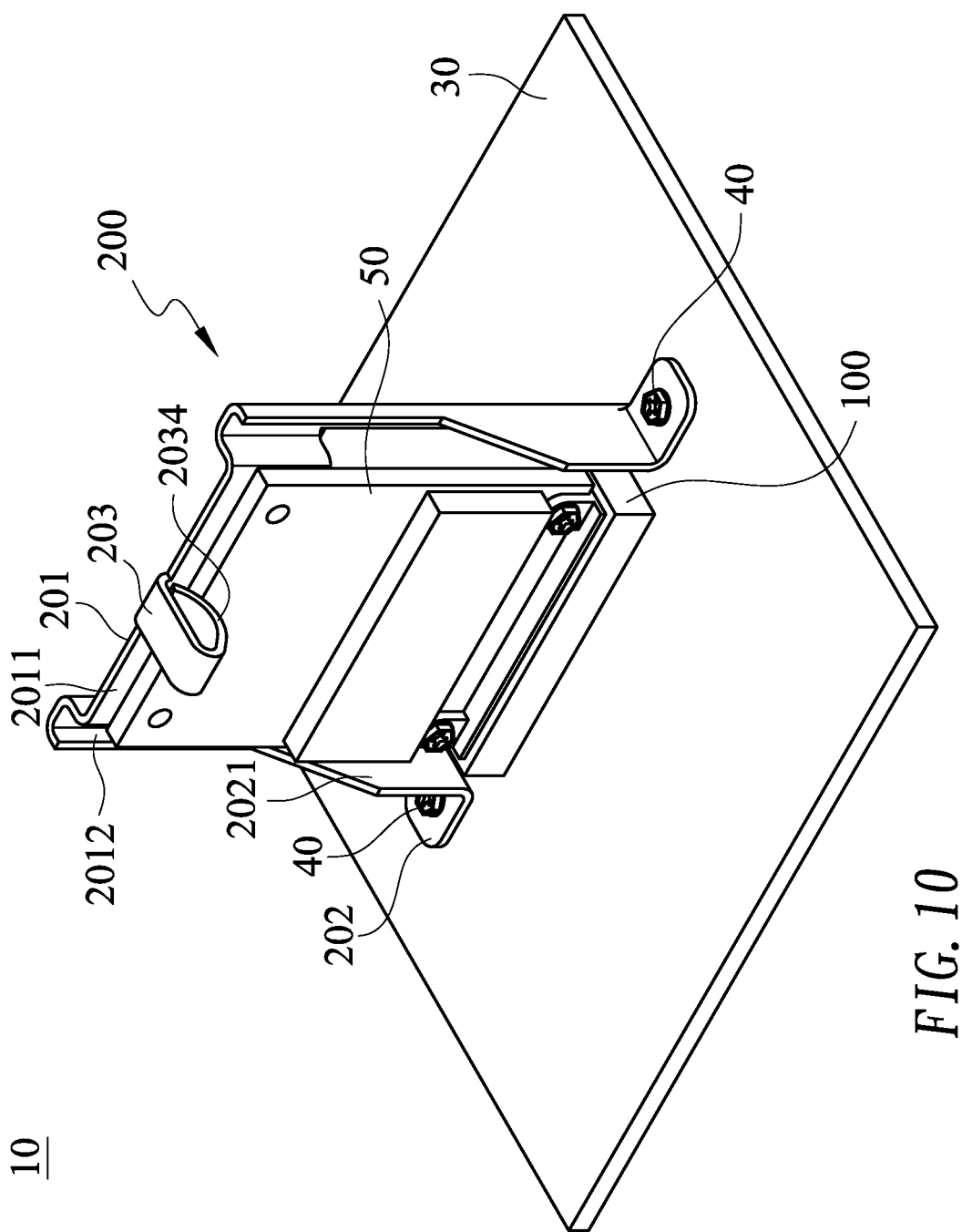
FIG. 10 is a schematic view of the expansion module of the fifth embodiment.

As shown in FIG. 10, when inserting one end of the interface card 50 into the electrical connector 100, the other end of the interface card 50 presses against the securing portion 203 of the frame 200, such that the interface card 50 is guided by the slope disposed on the clip 2034 of the securing portion 203 to slide to a position between the connecting portion 2011 of the main body 201 and the clip 2034 of the securing portion 203. At this time, the clip 2034 of the securing portion 203 is coupled to one edge, away from the electrical connector 100, of the interface card 50. Two ends of the interface card 50 both by the electrical connector 100 and the securing portion 203 of the frame 200; therefore the interface card 50 is fixed in the expansion module 10. Two ends of the interface card 50 are both fixed, so as to avoid the interface card 50 on the circuit board 30 from shaking or loosing. Compared with the screw-lock approach in the previous embodiment, coupling approach through the clip 2034 in the present embodiment is more convenient for the user to operate. Moreover, the clip 2034 is directly coupled to one edge of the interface card 50 instead of engaging into a through hole 51 on the interface card 50, such that through hole 51 is no more required on the interface card 50, and a lateral inserted-type electrical connector 101 for the interface card 50 be used, so as to enhance the general purpose of the expansion module 10.

Figure 11:
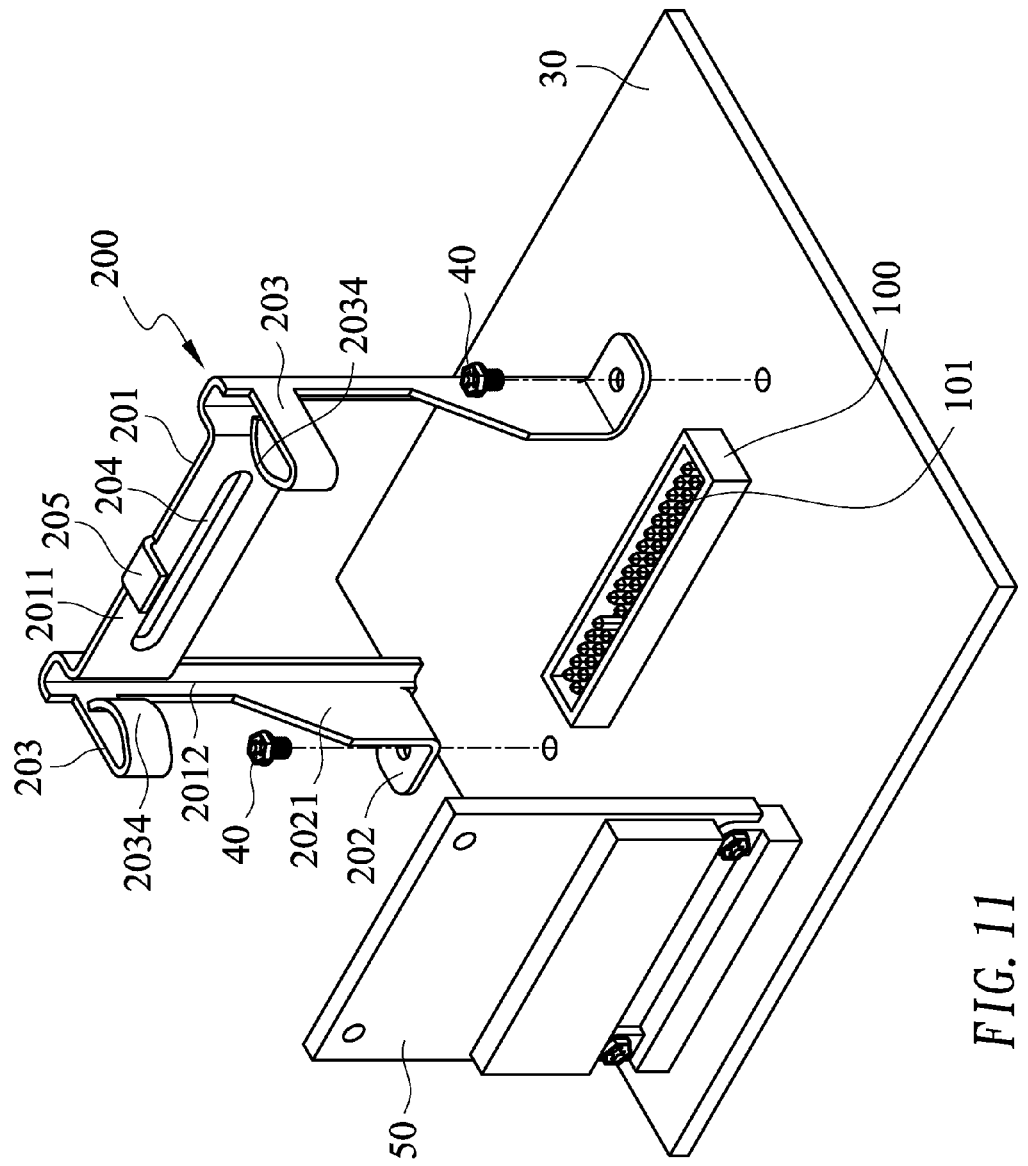
FIG. 11 is an explosive view according to a fifth embodiment.

Please referring to FIG. 11, an explosive view illustrates the sixth embodiment of the present invention. The expansion module 10 in the sixth embodiment is similar to that in the fifth embodiment. The different is that the frame 200 of the expansion module 10 includes two securing portions 203. The two securing portions 203 respectively extend from one edge of the each supporting portion 2012 of the main body 201. The o securing portions 203 are substantially perpendicular to the two supporting portions 2012. One end of each securing portion 203 connects to an edge of the each supporting portion 2012 of the main body 201, and the other end of each securing portion 203 formed with a clip 2034. A blocking portion 205 can be selectively formed on the connecting portion 2011 of the frame 200, and located on one edge of the connecting portion 2011 an away from fixing portion 202.

Figure 12:
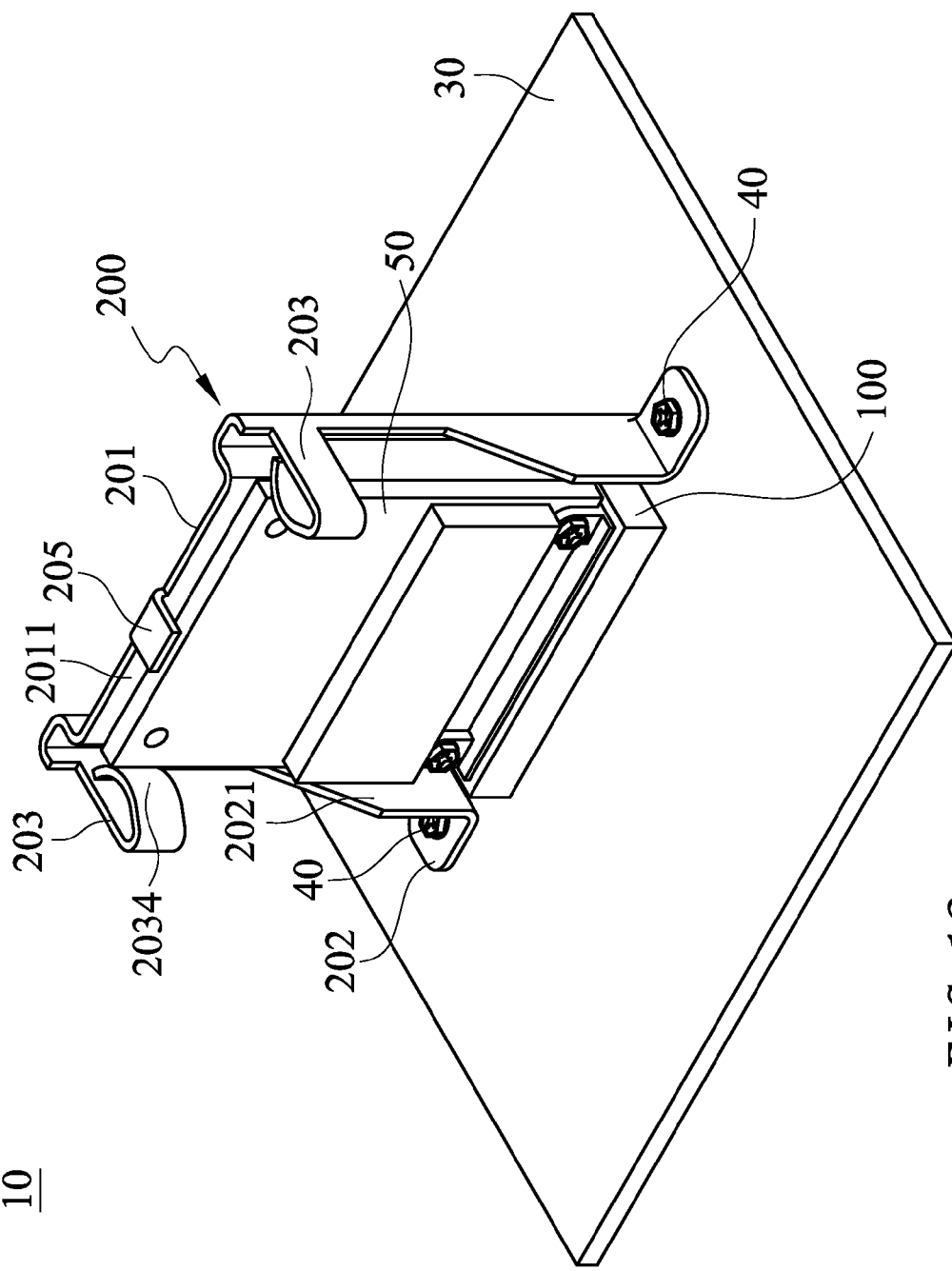
FIG. 12 is a schematic view of the expansion module of the fifth embodiment.

As shown in FIG. 12, the interface card 50 inserts into the electrical connector 100, two clips 2034 of the two securing portions 203 are respectively coupled to two opposite edges of the interface card 50, such that one end of the interface card 50, away from the electrical connector 100, is fixed between the two clips 2034. Therefore, the interface card 50 is fixed in the expansion module 10 by the electrical connector 100 and the securing portion 203 of the frame 200. The blocking portion 205 of the frame 200 is blocking one side, away from the electrical connector 100, of the interface card 50, so as to prevent the interface card 50 from sliding away from the electrical connector 100 along the vertical direction of the circuit board 30. The fasten part 40 of the previous embodiment, is replaced by the blocking portion 205 and the clips 2034 in the present embodiment to avoid the interface card 50 from shaking or loosing on the circuit board 30.

It should be noted that, in the sixth embodiment of the present invention, the blocking portion 205 is not a necessarily require component. Generally, the electrical slot 101 applies clipping force on one end of the interface card 50 while the two clips 2034 are coupled to the interface card 50. The fixing force provided by the electrical slot 101 and the two clips 2034 is enough to fix the interface card 50. Therefore, the blocking portion 205 in the sixth embodiment of the present invention is omitted.

Please refer to FIG. 1-FIG. 10, in order to increase the intensity of the frame 200 of the expansion module 10, the main body 201 optionally includes a reinforcement structure 204. The reinforcement structure 204 is formed on the surface of the connecting portion 2011 of the main body 201 and extends from one of the supporting portion 2012 to the other supporting portion 2012. The reinforcement structure 204 is a rib or a groove structure. The reinforcement structure 204 increase the rigidity of the connecting portion 2011 of the main body 201, so as to prevent the connecting portion 2011 from bent or broken under external impact.

It should be noted that the reinforcement structure 204 can also be implemented in any other portions of the frame 200 to increase the rigidity of the whole structure. For example, the reinforcement structure 204 is included in the conjunction between the connecting portion 2011 and the supporting portion 2012, or reinforcement structure 204 is formed on the other bent section such as the conjunction of the supporting portion 2012 and the fixing portion 202. In addition to enhance the supporting capability of the supporting portion 2012 applied on the frame 200, a side wall 2021 is formed by bending an extending edge of the supporting portion 2012 and the side wall 2021 extends toward the direction away from the main body 201, so as to enlarge the supporting area of the supporting portion 2012 connecting to the fixing portion 202. Therefore, the stability of the frame 200 on the circuit board 30 in increased.

As the expansion module 10 of the present invention described above, the securing portion 203 of the frame 200 provided additional fixing forces when inserting the interface card 50 into the expansion module 10, the interface card 50 is electrically coupled to the electrical connector 100. And the interface card 50 is vertically disposed on the circuit board 30 in accordance with the fastening of the frame 200. Vertically disposed interface card 50 decreases the space occupied by the interface card 50 and the expansion module 10 on the circuit board 30.

Meanwhile, the securing portion 203 implemented to lock or clip the interface card 50 in the frame 200 is integrally formed on the main body 201 of the frame 200, so as to prevent the interface card 50 from shaking or loosing by the external impact force. Therefore, the interface card 50 is firmly disposed on the circuit board 30 without affecting the operation of the computer system. On the other hand, the configuration of the frame 200 saves material for manufacturing the frame 200, such that the manufacture cost is reduced. Furthermore, the frame 200 can be widely used to fix different type of interface card.

The present invention has been disclosed as mentioned-above and it is understood the embodiments are not intended to limit the scope of the present invention. Moreover, as the contents disclosed herein should be readily understood and can be implemented by a person skilled in the art, all equivalent changes or modifications which do not depart from the spirit of the present invention should be encompassed by the appended claims.

What is claimed is:

1. A frame fixing an interface card on a circuit board, wherein the circuit board includes an electrical connector for connecting the interface card; the frame comprising:
   a main body, disposed on the circuit board and extending along a normal line direction of the circuit board;
   two fixing portions, integrally formed on the main body, wherein the main body is disposed on the circuit board through the two fixing portions;
   at least one securing portion, integrally formed on one side surface of the main body and corresponding to the electrical connector; when one end of the interface card electrically inserts in the electrical connector, the securing portion fixes the other end of the interface card; and
   a fasten part;
   wherein the main body includes a connecting portion and two supporting portion respectively connecting to two ends of the connecting portion, the two supporting portion extend on the same side of the connecting portion and respectively connect to the two fixing portion; the securing portion includes a positioning hole corresponding to a through hole of the interface hole, and the fasten part passes the through hole and is fixed within positioning hole, so as to fix the interface card to the securing portion, the securing portion is disposed on the connecting portion; and the securing portion includes two straight portions and a joining portion, the two straight portions connect to the connecting portion of the main body, and the joining portion connects to the two straight portions and spaced from the connecting portion of the main body with an interval, and the positioning hole is formed on the joining portion.

2. The frame as claimed in claim 1, further including at least one reinforcement structure, integrally formed on the connecting portion of the main body and extending from one of the supporting portion to the other supporting portion.

3. A frame fixing an interface card on a circuit board, wherein the circuit board includes an electrical connector for connecting the interface card; the frame comprising:
- a main body, disposed on the circuit board and extending along a normal line direction of the circuit board;
- two fixing portions, integrally formed on the main body, wherein the main body is disposed on the circuit board through the two fixing portions;
- at least one securing portion, integrally formed on one side surface of the main body and corresponding to the electrical connector; when one end of the interface card electrically inserts in the electrical connector, the securing portion fixes the other end of the interface card; and
- a fasten part;
- wherein the main body includes a connecting portion and two supporting portion respectively connecting to two ends of the connecting portion, the two supporting portion extend on the same side of the connecting portion and respectively connect to the two fixing portion; the securing portion includes a positioning hole corresponding to a through hole of the interface hole, and the fasten part passes the through hole and is fixed within positioning hole, so as to fix the interface card to the securing portion; the securing portion is disposed on one of the supporting portions of the main body, one end of the securing portion connects to one side surface of the supporting portion, and the other end of the securing portion extends toward another one of the supporting portion.

4. The frame as claimed in claim 3, further including at least one reinforcement structure, integrally formed on the connecting portion of the main body and extending from one of the supporting portion to the other supporting portion.

5. A frame fixing an interface card on a circuit board, wherein the circuit board includes an electrical connector for connecting the interface card; the frame comprising:
- a main body, disposed on the circuit board and extending along a normal line direction of the circuit board;
- two fixing portions, integrally formed on the main body, wherein the main body is disposed on the circuit board through the two fixing portions; and
- at least one securing portion, integrally formed on one side surface of the main body and corresponding to the electrical connector; when one end of the interface card electrically inserts in the electrical connector, the securing portion fixes the other end of the interface card;
- wherein the main body includes a connecting portion and two supporting portion respectively connecting to two ends of the connecting portion, the two supporting portion extend on the same side of the connecting portion and respectively connect to the two fixing portion; wherein one end of the securing portion connects to the connecting portion of the main body, and the other end of the securing portion is configured with a clip, when the interface card electrically connects to the electrical connector, the clip of the securing portion is coupled to one edge, away from the electrical connector, of the interface card.

6. The frame as claimed in claim 5, further including at least one reinforcement structure, integrally formed on the connecting portion of the main body and extending from one of the supporting portion to the other supporting portion.

\* \* \* \* \*